May 14, 1968   E. O. DIXON ET AL   3,383,622
END PUMPED LASER STRUCTURES EMPLOYING IMMERSION OPTICS
Filed Nov. 4, 1963   2 Sheets-Sheet 1

INVENTOR
EDGAR O. DIXON
GEORGE R. SIMPSON
BY
ATTORNEY

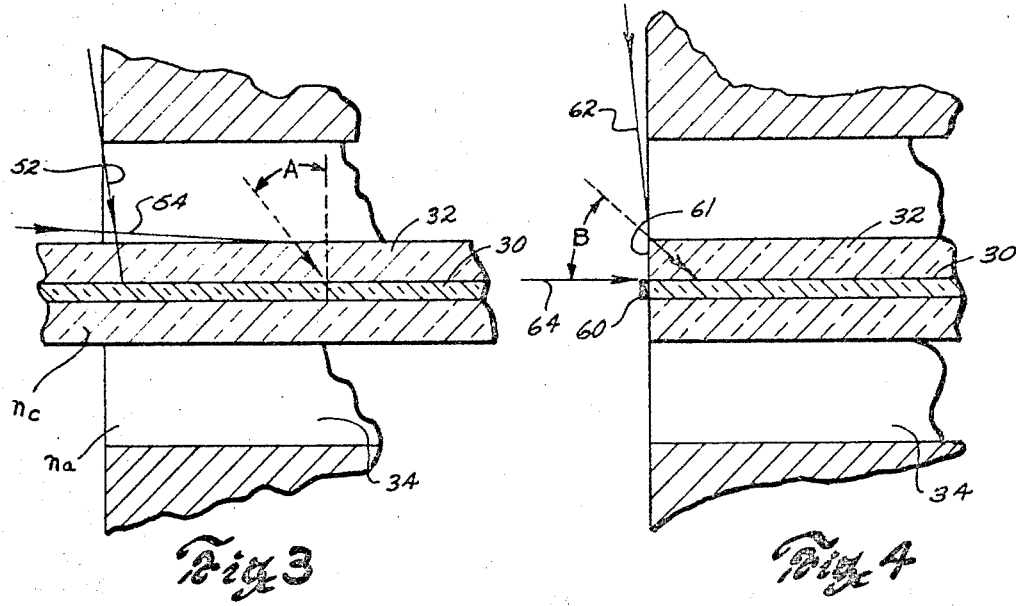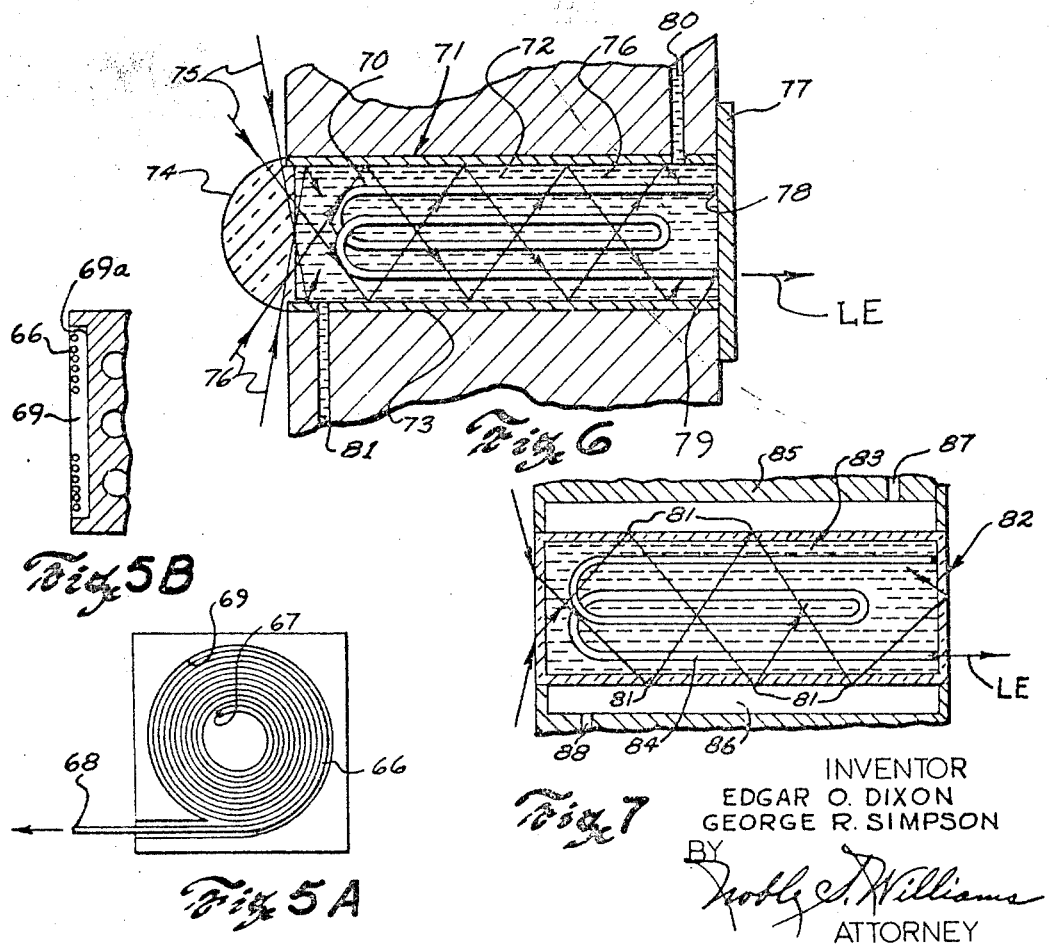

3,383,622
END PUMPED LASER STRUCTURES EMPLOYING IMMERSION OPTICS
Edgar O. Dixon, East Woodstock, and George R. Simpson, South Woodstock, Conn., assignors, by mesne assignments, to American Optical Company, Southbridge, Mass., a corporation of Delaware
Filed Nov. 4, 1963, Ser. No. 321,010
5 Claims. (Cl. 331—94.5)

ABSTRACT OF THE DISCLOSURE

End pumped laser structures employing improved optics and immersion means for increasing operative efficiencies thereof.

---

This invention relates to laser devices and the like, and more particularly to laser devices intended to be operated by optical energy derived from high intensity sources of spectral radiation such as the sun, a carbon arc, a xenon arc, or the like. More specifically, the invention has particular reference to improved optical and structural means for efficiently collecting and convergently directing pumping optical energy from such a light source into laser devices and to the laser element thereof and to the predetermined size and controlled configuration of the laser element so as to more advantageously and efficiently utilize this optical energy, as well as to means associated therewith for absorbing, transferring and dissipating heat generated during such laser operation.

In co-pending application Ser. No. 170,138, filed Jan. 13, 1962, and assigned to the assignee of the instant application optical means in the form of a relatively large concave spherical mirror has been disclosed as highly efficient means for collecting large amounts of optical energy, for example, from a carbon arc light source and for directing same as a convergent beam of pumping light rays into a positive refracting lens system of high numerical aperture, and this lens system was, in turn, arranged to provide a light source image of as highly condensed size and at as high intensity, or high flux density, as conveniently possible at the entrance end of a laser rod for laser pumping purposes. In this earlier laser construction, the laser rod formed a part of an optical resonant cavity for the laser device and had a first reflecting coating deposited upon its outer end and a second reflecting coating positioned upon an optical surface of the refracting lens system in such a manner that said reflecting coatings were in spaced aligned relation to each other with the rod of laser material disposed therebetween; said second coating being spaced from the inner end of the laser rod a substantial amount so as to allow as much pumping optical energy as possible to enter the inner end of the laser rod.

Furthermore, in this earlier laser construction, in order to utilize the optical pumping energy efficiently, the cross-sectional size of the laser rod was purposely arranged so as to be of substantially the same small predetermined size as the reduced size of the high intensity light source image being formed by the lens system. Thereafter the proper length of the laser rod was determined in accordance with the amount of pumping power available and the absorption and other operational characteristics of the laser material and of the laser cavity being used. One distinct advantage which was gained by the end pumping arrangements of the constructions of said earlier application was that of having the side wall portions of the laser rod available for direct heat transfer to a surrounding heat sink or the like during laser operation.

Even with such an efficient optical energy collecting and laser pumping arrangement, it has been, nevertheless, difficult at times to reach a threshold condition for such laser devices. Also, it should be appreciated that even when laser operations has been obtained in such laser devices, the laser emission has been materially limited in achieved brightness by the high threshold conditions encountered in such earlier systems.

It has now been found, however, that by following the teachings of the present invention, it is possible to provide improved laser devices which may be more efficiently operated by optical energy from such high intensity pumping light sources having condensed images of small predetermined sizes and which devices embody modified constructions and arrangements of parts whereby the threshold values required for laser operation of these devices will be materially reduced as compared to the threshold values which have been required heretofore. These improved devices include not only changes in the laser element configuration but also in the optical and immersion means associated therewith for more efficiently concentrating and directing the pumping optical energy into the laser elements. Also, the improved devices are of such design and construction as to be able to efficiently dissipate much of the heat generated during laser operations.

It is, accordingly, an object of the present invention to provide a device which employs in combination optical means or system for collecting optical energy from a high intensity light source and a laser construction comprising a relatively thin long laser element disposed within a light-confining chamber in such a way as to be efficiently irradiated by said optical energy and provide a materially reduced threshold value for the laser cavity thereof. The laser element of the invention, while being in most instances of substantially the same volume of active laser material as heretofore is, nevertheless, of a materially greater length and a materially lesser diameter for improved threshold conditions and is immersed in a transparent medium or material of a lower refractive index in surrounding contacting relation with side wall portions of the element. This transparent material, it should be noted, may be a suitable solid, or liquid, or gas, or air, as desired, and is disposed, together with the laser element, in such optical relation relative to the small high intensity light source image being formed by the optical means or system that most of the image forming optical energy will be available for pumping purposes and a lower threshold condition will be provided by the improved structure than has been possible heretofore.

The arrangement of parts, furthermore, is such that not only may wall portions of such a chamber serve as highly reflecting means for the pumping light rays within the chamber but also these wall portions may be arranged to help confine the transparent liquid or fluid therein so as to serve as an immersant for the laser element. In fact, in one modified construction, this liquid has nearly the same index of refraction as the adjacent lens of the refracting lens system and cooperates therewith while also serving as a circulated cooling medium. At the same time, means may be associated with certain of these wall portions for conducting heat away from the chamber or cell during operation of the device.

It is a further object of the invention to provide for such a laser construction or laser device a careful control of the length, width and configuration of the laser element, while the volume thereof remains unchanged, and a careful control as to the immersing means surrounding the laser element whereby even though the laser element may be in a relatively sharply bent or coiled shape, nevertheless, laser emission at least in the form of lower order modes will be projected therefrom.

Other objects and advantages of the invention will become apparent from the detailed description which follows when taken in conjunction with the accompanying drawings in which:

FIG. 3 is an enlarged fragmentary sectional view of a part of the structure of FIG. 2A;

FIG. 4 is a showing somewhat similar to that in FIG. 3 but showing a modified construction;

FIGS. 5A and 5B are respectively a plan view and a cross-sectional view of a modified construction employing a thin elongated closely coiled laser element disposed in a light-reflecting chamber;

FIG. 6 is a fragmentary longitudinal sectional view of a further modification of the invention employing a cell for confining a liquid immersant and using a refracting lens element as a confining wall for said cell; and FIG. 7 is a fragmentary sectional view somewhat like that of FIG. 6 but showing a further modification of the invention.

Figure 1:
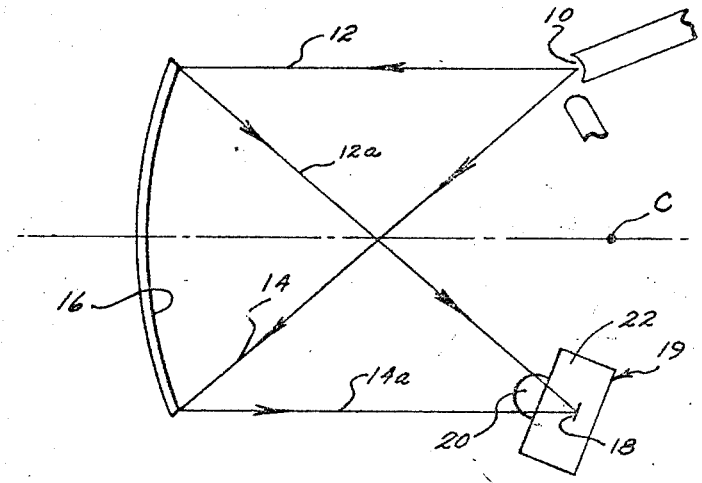
FIG. 1 is a diagrammatic showing of a light source and reflector arranged in combination with a laser device comprising a refracting lens system and laser construction embodying the present invention.

Referring to the drawing in detail and in particular to FIG. 1, there is shown at 10 a small high intensity light source, such as provided by the crater of a carbon arc, and light from this source, as indicated by extreme outer light rays 12 and 14 will impinge upon a concavely curved spherical mirror 16 and will be reflected thereby, as indicated by rays 12a and 14a so as to tend to form a small high intensity image of the light source at a conjugate image plane 18. Since the center of curvature of mirror 16 is at point C and the light source 10 and its image at 18 are adjacent but spaced to opposite sides of this center C a nearly aberration-free image at substantially a 1-to-1 object-to-image ratio is provided thereby. Also indicated in outline at 19 is a laser device comprising a refracting lens system 20 and a laser construction 22 arranged to receive these light rays.

Figure 2A:
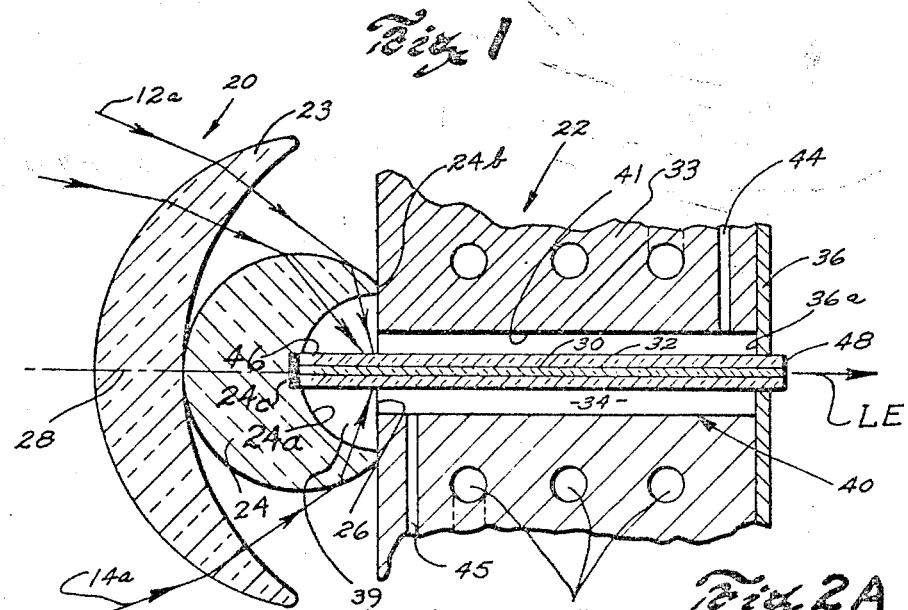
FIG. 2A is an enlarged fragmentary longitudinal sectional view of a refracting lens system and laser construction of the type employed in FIG. 1.

In a manner similar to that described in the earlier-filed co-pending application mentioned above, this refracting lens system 20 is positioned in the convergent beam indicated by reflected light rays 12a and 14a which, as better shown in FIG. 2A, first impinge upon a refracting meniscus aplanatic lens element 23 and then upon a hyperhemispherical aplanatic lens element 24 in such a manner as to be bent inwardly and form an image of predetermined small size and of as high flux density as conveniently possible at an image plane 26.

Figure 2B:
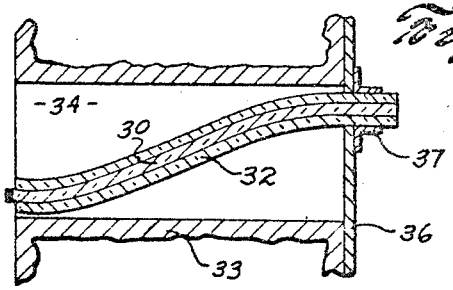
FIG. 2B shows a slight modification thereof.

The laser construction 22 associated with the refracting lens system comprises a thin elongated laser element 30 formed of an active laser material, such as a neodymium doped barium crown glass, and this laser element is disposed within a light-confining chamber 34 generally optically aligned with the axis 28 of the lens system 20. Surrounding the laser element 30 and in optical contact therewith is shown a cladding 32 which is formed of such a transparent material, preferably glass, as to be highly transmissive to optical energy at the pumping wavelengths required for exciting the laser material to a higher energy state for stimulated emission. This cladding material is also chosen so as to have a lesser refractive index than that of the material forming the laser element. The chamber 34 for housing the laser element 30 and cladding 32 is of cylindrical shape and, as shown in FIG. 2A, is formed in a metallic supporting member 33 of high heat conductivity, and while laser element 30 is here shown as a straight element disposed centrally within the chamber 34 for receiving the pumping light rays, it might be even more effective to have this element somewhat off axis, or bent, or even at a skew angle in said chamber as suggested at 30a and 32a in FIG. 2B so as to catch all skew rays as well.

The outer end of the laser element and cladding assembly in FIG. 2A is supported by and extends outwardly through an aperture formed in a metallic end plate 36 and the inner end of element 30 and cladding 32, as shown, are contained and supported in a shallow recess 24c formed centrally in the rear lens surface 24a. (Or it would even be possible, if desired, and as suggested in FIG. 2B, to support this laser assembly in proper position in the chamber 34 entirely by the apertured end plate 36 and suitable clamping means 37 secured to the outer side of plate 36, and in this last-mentioned arrangement, the inner end of the laser element and cladding material could be arranged to lie substantially at the image plane 26.)

Plate 36, in turn, is supported by the supporting member 33 which has its opposite side arranged in contacting supporting relation with a peripheral edge portion 24b of the lens element 24, and in this manner, the generally hemispherical space 39 and cylindrical chamber 34 will form together a fluid-tight enclosure 40. In this particular construction, the metallic cylindrical side walls as well as the inner surface 36a of the end plate 36 will be silvered or polished so as to be highly reflective to the pumping optical energy incident thereon.

Included within the supporting member 33 is a plurality of conduits or passageways 42 through which a cooling liquid may be forced during operation of the laser device. Also shown in this supporting member 33 and in communication with the chamber 34 are conduits 44 and 45 through which a liquid or fluid of suitable refractive index and light-transmitting properties may also be caused to flow for cooling during laser operation.

The diameter of cylindrically-shaped chamber 34 is carefully controlled so as to be of substantially the same size as the light source image being formed at 26. Thus, the high intensity optical energy at the light source image plane 26 will enter the inner end of the chamber 34, and much of this light will experience a plurality of reflections from the interior wall portions of this chamber. Some of this pumping energy will be absorbed by the active material forming the laser element 30 each time it passes through the laser material (due, of course, to multiple reflections within the chamber 34), and thus the greater part of the optical energy will be effectively absorbed by the laser material. Upon the opposite ends of the laser element and cladding, as indicated at 46 and 48 in FIG. 2A are highly reflective coatings for forming an optical resonant cavity in the laser material included therebetween. Thus, when sufficient pumping optical energy is supplied to this laser element, energy at a predetermined laser emission wavelength can be caused to resonate therewithin, and since the reflecting coating 48, in known fashion, will be arranged to have a slight amount of transmissivity for light at the laser emission wavelength, a laser beam, as indicated by the arrow LE, will be emitted outwardly therethrough.

If attention is now directed to the enlarged fragmentary showing in FIG. 3, and it is considered that the diameter of the end of the cylindrical chamber 34 is substantially of the same size as the high intensity light source image being formed by the refracting optical system 20 and that air is contained within the chamber 34, it will be appreciated that substantially all of those pumping light rays of the convergent beam travelling toward the open inner end of this chamber and which are included between outermost light ray 52 and innermost light ray 54 at grazing incidence, will be directed into the chamber and will be refracted into the higher index cladding material 32 and into the laser material as indicated. Since ray 54 is at grazing incidence, it should be noted that within the cladding material, this ray will be at the critical angle of total internal reflection established by the refractive index difference between the material being used to form the cladding glass and the refractive index of air (which, of course, is equal to 1). Therefore, the angle included between these extreme rays after refraction into the cladding material, as indicated at A, will be an indication of the effective numerical aperture, or the NA, of the system. Accordingly, if $n_c$ is the refractive index of the cladding glass of 1.52 index, for example, then the angle A will be equal to $$\sin^{-1}\frac{1}{n_c}$$

and will have a numerical value of approximately 43°.

In such a construction as shown in FIG. 2A wherein the inner reflecting coating 46 extends over the entire inner end of the laser element 30 and the cladding material 32, a significant amount of convergent light rays will be blocked out thereby. (In fact, even more would be blocked out by coating 46 in a construction wherein the inner end of the laser element and cladding terminate substantially at the image plate 26.) If, on the other hand, a modified construction, such as indicated in FIG. 4, is employed, it will be possible to effect a material increase in the total amount of pumping energy which will be allowed to reach the laser element; and in some laser constructions such an increase may be most welcome. In FIG. 4, instead of the inner reflecting coating for effecting the resonant laser cavity extending over the entire laser element and cladding assembly, a reflecting coating 60 is provided only upon the exposed inner end of the laser element 30. Accordingly, ray 62 impinging upon the uncoated end area 61 of the cladding may be considered the outermost light ray and ray 64 may be considered the innermost light ray which will impinge upon and enter the end of the cladding 32. Ray 62, being at grazing incidence, will likewise enter the cladding at the critical angle of total internal reflection for this glass-to-air interface. Thus, the angle B between these rays 62 and 64 as they travel within the cladding material will be a measure of the numerical aperture provided for this light entering the end of the cladding 32. Thus, since angles A and B are equal and an optical system of annular symmetry is here being considered, a total solid angle of pumping illumination of nearly 4 steradians will be provided by the construction in FIG. 4.

Since the size of the light source image and its maximum brightness in the laser system of the aforementioned application were limited, the laser rod thereof was made of such a diameter as to accept substantially all of the available optical energy of the high intensity image, and thereafter the length of the rod was made as long as permissible, in order to absorb as much of this pumping energy as possible, provided, however, that the pumping energy passing into the laser material did not fall below threshold before reaching the other end thereof.

It has now been found that laser oscillation in an optical resonant cavity can be produced at a lower threshold value if a change in the geometry of the cavity, as will be presently described, is made and care is exercised to make sure that the following threshold equation is at the same time satisfied:

$$e^{(\beta-s)2L} = \frac{1}{r_1 r_2}$$

and wherein $$\beta = s - \frac{Lnr_1r_2}{2L}$$

$\beta$ being the gain coefficient of the pumped laser material at threshold, in cm.$^{-1}$ (and, therefore, proportional to the brightness of the light source image); $s$ is the loss coefficient of the laser material (in cm.$^{-1}$) including losses due to scattering and absorption at the laser emission wavelength; $r_1$ and $r_2$ are the reflectances of the opposed end mirrors; $n$ is the refractive index of the laser material, and L is the length of the cavity. It is clear from the foregoing equation that for a laser of given size (volume), the transmission and absorption losses due to the end reflectors become comparatively less important and a reduction in threshold value can be expected as the laser element's length is increased and its width correspondingly decreased.

Since a reduction in threshold has been possible, as already indicated, in a resonant laser cavity construction by an increase in the length of the cavity between the reflectors at its opposite ends and a corresponding decrease in its diameter while keeping the volume of the laser material and total absorbed pumping energy substantially unchanged, and since in a long thin "closed" resonant cavity laser construction of the type here being considered, the refractive index difference between the laser material and the transparent material of lower refractive index in surrounding contacting relation with its side walls is a measure of the angle of total internal reflection at the interface there-between for the stimulated optical energy which will be trapped therewithin, it is possible to make a change in the laser configuration, such as suggested by the flat helically-coiled arrangement shown at 66 in FIGS. 5A and 5B while still fitting this laser material within the limited size of the light source image. In this modification, a chamber 69 of a size equal to the image diameter is shown. Of course, in such an arrangement as shown in FIGS. 5A and 5B, the refractive index difference between laser element 66 and its surround should be high enough so as to insure that no desired laser energy will be lost out through the curved side walls of such a coiled or bent laser element. The inner end of this coiled element 66 would be coated as at 67 so as to be 100% reflecting while the coating 68 on the emitting end thereof would have a small amount of transmission. Also, a reflecting surface 69a would be employed immediately behind the coiled laser element so as to reflect back into the laser element any pumping energy which might not be absorbed while initially passing therethrough.

While a refracting optical system has been mentioned above as one form of optical energy concentrating means for forming a light source image of high intensity at the entrance end of the chamber 34 for pumping purposes, it would also be possible, in the present invention, to employ equivalent optical energy concentrating means such as a spherical mirror, or an internally reflecting hollow metallic cone, or even a totally internally reflecting glass cone for providing the high intensity light source image for pumping purposes.

Another configuration taking advantage of the reduction in laser threshold which can be had by a thin long laser element between materially spaced end reflectors is shown in FIG. 6. In this figure, there is shown an arrangement somewhat like that of FIGS. 2A and 2B except that instead of a long thin nearly straight laser element in air, a looped laser element 70, which may be clad or unclad, is used and is immersed in liquid in a cell 71. In this manner, a considerably greater length of laser element can be accommodated. The liquid is indicated at 72 within the cell and the side walls 73 which may be formed of glass or metal, would be silvered or highly polished. The front end wall 74, however, would preferably be in the form of a hemispherical lens of substantially the same refractive index as the liquid 72. Thus, pumping energy after it has entered the cell through this transparent lens-like front wall 74 without refraction, as indicated by light rays 75 and 76, will be reflected by the walls of the cell and directed into the laser material. A cladding material, if used for the laser element or the immersing liquid, would have an index value sufficiently below that of the laser material to insure that the stimulated photons therein will be trapped by total internal reflection. It follows that in such an arrangement, a higher maximum numerical aperture will be provided for the pumping optical energy since same would be equal to the refractive index of the liquid being used. In this arrangement, the light rays will be repeatedly reflected from the metallic side walls and the end wall 77. However, the looped laser element 70 of greater length is easily accommodated and at the same time pumping energy at a higher numerical aperture is supplied thereto. Note that both coated ends 78 and 79 of the laser cavity are out of the path of the entering light rays. Preferably, one end, as at 79, will be made slightly transmitting for emitting energy at the laser wavelength as indicated by arrow LE. An acceptable liquid within the cell 71 might be carbon tetrachloride and would not only act as an immersant for the laser element but also as a coolant, which could, if desired, be re-circulated through conduits 80 and 81.

Notwithstanding the fact that a fluid has been mentioned above as an immersant for obtaining a higher pumping N.A. than would be possible when air is used as the immersant, it might be possible to obtain an even better working arrangement by the use of a structure along the lines of that shown in FIG. 7, wherein a cell 82 formed of glass is shown surrounded by an air chamber 86 and within this cell is contained a fluid immersant 83 in surrounding contacting relation with a looped laser element 84 so that total internal reflection of all the pumping light rays within the cell at the glass-air interface will occur. In such an arrangement, substantially no light will be lost at the reflecting glass-air interfaces, such as indicated at 81. (Note that in an arrangement like that in FIG. 6 wherein metal reflecting surfaces are used, a material loss due to absorption occurs at each reflection.) In such an arrangement as shown in FIG. 7, a maximum numerical aperture of $\sqrt{(n_b^2-1)^2}$ will be provided when $n_b$ is the refractive index of the liquid and while this will give a smaller N.A. than in FIG. 6, nevertheless a much more efficient overall condition may result due to the characteristics of this liquid filled cell 82 wherein substantially no loss of energy by absorption at any reflection will occur. The cell is supported by support member 85 which provides the air chamber 86 encircling the cell; and the air in this chamber may be easily changed and cooled, if desired, through inlet and outlet ducts 87 and 88.

Having described our invention, we claim:

1. A device for producing stimulated laser emission, said device comprising a light-collecting and condensing optical system adapted to receive pumping light rays from high intensity pumping light source and to focus same as a light source image of small predetermined size and at substantially as high flux density as possible at a predetermined image plane of said optical system, means defining a cylindrically-shaped chamber disposed in aligned concentric relation to the axis of said optical system and having one end thereof positioned substantially at said image plane, said cylindrically-shaped chamber being disposed at the opposite side of said image plane from said optical system and having a diameter substantially equal to the diameter of said light source image so as to receive substantially all of said pumping light rays passing beyond said image plane, said chamber being of an appreciably greater length than the transverse dimension thereof, a relatively long, thin laser element of predetermined refractive index disposed generally lengthwise within said chamber and having a materially lesser cross-sectional size than the cross-sectional size of said chamber, a transparent medium surrounding substantially all parts of said laser element and immersing the side wall portions thereof and substantially completely filling said chamber, said transparent medium having a predetermined refractive index of a lower value than that of said laser element and of a higher value than that of air, the bounding side wall surface portions of said cylindrically-shaped chamber being highly reflective to said pumping light rays, a pair of reflective coatings disposed upon the opposite ends of said laser element and forming an optical resonant cavity in said laser element therebetween, one end of said laser element being positioned so as to direct optical energy at laser emission wavelength outwardly of said chamber and the reflective end coating thereon being slightly transmissive to optical energy at the laser emission wavelength, said transparent medium immersing said laser element serving to refract pumping optical energy into said laser element at all locations throughout the length thereof.

2. A laser device as defined in claim 1 and in which the means defining said cylindrically-shaped chamber is formed of metal of high heat conductivity.

3. A laser device as defined in claim 1 and in which the bounding side wall portions of said cylindrically-shaped chamber are formed by a clear transparent material of a lower refractive index value than that of said laser material and are surrounded through the greater part of their lengths by air, whereby pumping light rays travelling within said chamber and incident upon the side wall interface formed between said clear transparent material and said air will be totally internally reflected.

4. A laser device as defined in claim 1 and in which said thin, long laser element within said cylindrical chamber has at least a substantial portion thereof disposed in a skewed relation relative to the longitudinal axis of said chamber so as to aid in intercepting off-axis pumping light rays travelling therewithin.

5. A laser device as defined in claim 1 and in which said thin, long laser element is of appreciably greater length than the length of said chamber and is provided with an open looped arrangement intermediate its ends interconnecting a plurality of elongated sections of said element disposed generally lengthwise within said chamber.

References Cited

UNITED STATES PATENTS

| | | | |
|---|---|---|---|
| 3,196,366 | 7/1965 | Simpson | 331—94.5 |
| 3,229,222 | 1/1966 | Sorokin et al. | 331—94.5 |
| 3,242,440 | 3/1966 | Koester et al. | 331—94.5 |

JEWELL H. PEDERSEN, *Primary Examiner.*

W. L. SIKES, *Assistant Examiner.*